US006434176B1

(12) United States Patent
Deck

(10) Patent No.: US 6,434,176 B1
(45) Date of Patent: Aug. 13, 2002

(54) FREQUENCY STABILIZED LASER SYSTEM

(75) Inventor: Leslie Ludwig Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/245,170

(22) Filed: Feb. 5, 1999

(51) Int. Cl.[7] .............................. H01S 3/13; G01B 9/02
(52) U.S. Cl. ......................................... 372/32; 356/484
(58) Field of Search .............................. 372/23, 29, 31, 372/32; 356/484, 487

(56) References Cited

U.S. PATENT DOCUMENTS

| 3,534,292 A | | 10/1970 | Cutler |
| 3,889,207 A | | 6/1975 | Burgwald et al. |
| 4,987,574 A | * | 1/1991 | Rowley et al. ............... 372/28 |
| 5,014,278 A | * | 5/1991 | Deki ........................... 372/32 |

OTHER PUBLICATIONS

Baer et al., "Frequency Stabilization of a 0.633–μm He–Ne Longitudinal Zeeman Laser", *Applied Optics*, 19:3173–3177, Sep. 15, 1980.
Dukes et al., "A Two–Hundred–Foot Yardstick with Graduations Every Microinch", *Hewlett–Packard Journal*, 21:1–16, Aug. 1970.
Doyle et al., "P–5–Frequency Discrimination Characteristics of an Elliptically Polarized Dual–Polarization Ga Laser", *IEEE Journal of Quantum Electronics*, QE–4: 870–874. Nov. 1968.

Hall et al., "Principles of Optical Phase–Locking: Application to Internal Mirror He–Ne Laser Phase–Locked via Fast Control of the Discharge Current", *IEEE Journal of Quantum Electronics* QE–23:427–437, Apr. 1987.
Niebauer et al., "Frequency Stability Measurements on Polarization–Stabilized He–Ne Lasers", *Applied Optics*, 27:1285–1289, Apr. 1, 1988.
Salomon et al., "Laser Stabilization at the Millihertz Level", *J.Opt.Soc.Am.B.*, 5:1576–1587.
Yasui et al., "An Intermittent Frequency Offset Lock a Transverse Zeeman Laser to an Iodine Stabilized He–Ne Laser", *Optical Review*, 3:197–201, 1996.

* cited by examiner

*Primary Examiner*—Frank G. Font
*Assistant Examiner*—Andrew H. Lee
(74) *Attorney, Agent, or Firm*—Fish & Richardson, P.C.

(57) ABSTRACT

The invention features a frequency stabilized laser system including a laser source, a first detector, a second detectors, and a circuit. The laser source has an adjustable cavity length and, during operation, produces a control beam including two frequency components having different polarizations. The first detector absorbs a portion of the control beam, reflects the remaining portion of the control beam, and generates a first signal proportional to the intensity of the absorbed portion of the control beam. The second detector absorbs a portion of the reflected beam and generates a second signal proportional to the intensity of the absorbed portion of the reflected beam. The circuit receives the first and second signals from the detectors and generates a control signal based on the first and second signals that controls the adjustable cavity length of the laser source. The frequency stabilized laser system can be used in interferometry applications or any other application in which frequency stability is beneficial.

30 Claims, 4 Drawing Sheets

FREQUENCY STABILIZED LASER SYSTEM

BACKGROUND OF THE INVENTION

This invention relates to frequency stabilized lasers and their application to interferometry, including, for example, distance measuring interferometry.

Interferometers exploit the wave nature of light to measure properties such as distance, flatness, and refractive index. For example, a displacement measuring interferometer (DMI) monitors a change in the position of a measurement object relative to a reference object based on an optical interference signal formed by overlapping and interfering a measurement beam reflected from the measurement object with a reference beam reflected from the reference object. For many applications, a laser is used to provide light for the interferometric measurement and the accuracy of the measurement is typically a small fraction of the wavelength of the light generated by the laser for the measurement (e.g., about, or even less than, 1 nm). To provide such accuracy, however, the wavelength (or corresponding optical frequency) of the generated light should be stable during the interferometric measurements.

The optical frequencies of light generated by a laser depend on the resonant modes supported by the laser cavity (which define resonant frequencies), the frequency-dependent gain of the gain medium in the laser (known as the gain curve), and the frequency-dependent losses of the laser cavity. The frequencies that lase are those resonant frequencies for which gain from the gain medium exceeds loss from the laser cavity.

Variable conditions both inside and outside the laser cavity can cause changes in the cavity length, thereby changing the resonant frequencies and the lasing frequencies therein. In addition, because the gain from the gain medium varies with frequency (the peak gain corresponding to a quantum transition frequency), the relative intensity of the laser output at each lasing frequency changes when the lasing frequency changes. As a result, changes in the relative intensity of the laser output at different lasing frequencies can be measured to monitor changes in the lasing frequencies themselves. Therefore, the lasing frequencies can be stabilized by adjusting the laser cavity length in response to the measured changes in the relative intensities.

SUMMARY OF THE INVENTION

In general, in one aspect, the invention features a frequency stabilized laser system including a laser source, a first detector, a second detectors, and a circuit. The laser source has an adjustable cavity length and, during operation, produces a control beam including two frequency components having different polarizations. The first detector absorbs a portion of the control beam, reflects the remaining portion of the control beam, and generates a first signal proportional to the intensity of the absorbed portion of the control beam. The second detector absorbs a portion of the reflected beam and generates a second signal proportional to the intensity of the absorbed portion of the reflected beam. The circuit receives the first and second signals from the detectors and generates a control signal based on the first and second signals that controls the adjustable cavity length of the laser source.

Embodiments of the frequency stabilized laser system can include any of the following features.

The gain of the first detector used to produce the first signal can differ from the gain of the second detector used to produce the second signal, and the control signal can be based on the difference between the first and second signals. Alternatively, or in addition, the circuit can generate the control signal based on a weighted difference between the first and second signals.

The control beam can contact the first detector at a first angle of incidence and the reflected beam can contact the second detector at a second angle of incidence such that the relative intensities of the two frequency components in the absorbed portion of the control beam differs from the relative intensities of the two frequency components in the absorbed portion of the reflected beam. For example, the control beam can contact the first detector at a first angle of incidence in a range between 5° and 85°. Also, the first angle of incidence can be substantially equal to the second angle of incidence. The first detector, second detector, or each of the first and second detectors can be a silicon detector that does not have an antireflection coating.

The second detector can reflect a portion of the reflected beam to produce a reference beam. The control beam contacts the first detector at a first angle of incidence and the reflected beam contacts the second detector at a second angle of incidence such that the reference beam includes the two frequency components. The frequency stabilized laser system can further include a fiber optic coupler positioned to receive the reference beam. Alternatively, or in addition, at least one of the first and second detectors can have a bandwidth sufficient to resolve an optical interference signal at a frequency that is equal to the difference frequency of the two frequency components.

The different polarizations in the control beam produced by the laser source can be orthogonal elliptical polarizations. The laser source can include a Zeeman-split laser that produces the control beam including the two frequency components having the different polarizations. The Zeeman-split laser can include a birefringent element that causes the different polarizations to be different elliptical polarizations. For example, the birefringent element can be a coated cavity mirror. Alternatively, or in addition, the laser source can further include a birefringent element positioned to receive an input beam from the Zeeman-split laser and produce the control beam, wherein the birefringent element causes the different polarizations of the control beam to have different elliptical polarizations. The control beam can be derived from leakage through one of the cavity mirrors in the laser source.

The laser source can also produce, during operation, a measurement beam including the two frequency components. The frequency components of the measurement beam are stabilized by the interaction between the circuit and the adjustable cavity length. The laser source can include a transducer to adjust the cavity length of the laser source. For example, the laser source can include a gas tube defining the cavity length and the transducer can be a heating coil in thermal contact with the gas tube.

Many embodiments of the frequency stabilized laser system have a relatively small number of optics. For example, embodiments of the system can have no intervening optics contacting the control beam between the laser source and the first detector and/or no intervening optics contacting the reflected beam between the first and second detectors.

In another aspect, the invention features an interferometry system including the frequency stabilized laser system described above and an interferometer. The interferometer receives a measurement beam produced by the laser system, directs a portion of the measurement beam along a path contacting a measurement object, and recombines the portion with a remaining portion of the measurement beam to produce an output beam. The output beam has a phase indicative of changes in an optical path length to the measurement object.

In another aspect, the invention features an interferometry system including the frequency stabilized laser system described above, an interferometer, and a detection system. During operation, the interferometer receives a measurement beam produced by the laser system, directs a portion of the measurement beam along a path contacting a measurement object, and recombines the portion with a remaining portion of the measurement beam to produce an output beam. The detection system receives the output beam and a reference beam produced by the laser system, measures frequencies of the output and reference beams, and determines changes in an optical path length to the measurement object based on the measured frequencies.

In general, in another aspect, the invention features a method for stabilizing the frequency output of a laser source producing a control beam including two frequency components having different polarizations, the laser source having an adjustable cavity length. The method includes: directing the control beam to a first detector that absorbs a portion of the control beam, reflects the remaining portion of the control beam, and measures an intensity of the absorbed portion of the control beam; directing the reflected beam to a second detector that absorbs a portion of the reflected beam and measures an intensity of the absorbed portion of the reflected beam; and adjusting the cavity length of the laser source based on a control signal derived from the intensities measured by the first and second detectors.

Embodiments of the method can include any of the following features. The method can further include determining the control signal by scaling the intensities measured by the first and second detectors such that the difference between the scaled intensities is indicative of the relative intensities of the two frequency components produced by the laser source. The method can further include resolving an interference signal in the measured intensity of at least one of the detectors corresponding to the difference frequency of the two frequency components produced by the laser source. Alternatively, or in addition, the second detector can reflect a portion of the reflected beam to define a reference beam, and the method can further include measuring an optical interference signal in a reference beam corresponding to the difference frequency of the two frequency components produced by the laser source.

In another aspect, the invention features an interferometry method that includes stabilizing the frequency output of a laser source as described above and using the stabilized output to make interferometric measurements.

The invention has many advantages. For example, the frequency stabilized laser system is inexpensive and compact, not requiring expensive optics such as quarter wave plates or polarizing beam splitters for frequency stabilization. The laser system can measure the relative intensities of two frequency separated laser modes without such optics and use the relative intensity measurement to adjust the cavity length of a laser and thereby stabilize the lasing frequencies.

The frequency stabilized laser system is also suitable for interferometry applications. In particular, the system provides two stabilized frequency components with different polarizations suitable for heterodyne interferometry measurements. Moreover, in some embodiments, the system additionally provides a reference beam in which the polarizations of the two stabilized frequency components are mixed. As a result, the reference beam includes a time-varying intensity corresponding to the heterodyne frequency (i.e., the difference frequency between the two stabilized frequency components). In particular, no analyzer (e.g., polarizer) is required to mix the polarizations of the two frequency components to produce the time-varying intensity at the heterodyne frequency. Instead, the heterodyne frequency can be determined by directly measuring the intensity of the reference beam. Alternatively, the heterodyne frequency can be determined from a high bandwidth measurement by the first or second detector. The system can also be used in homodyne interferometry applications in which only a single stabilized frequency is necessary.

Other features, aspects, and advantages will be clear from the following detailed description and from the claims.

BRIEF DESCRIPTION OF THE DRAWINGS

FIG. 1b is a schematic diagram of the laser in the frequency stabilized laser system of FIG. 1a.

FIG. 2 is a schematic diagram of the feedback control portion in the frequency stabilized laser system of FIG. 1a.

DETAILED DESCRIPTION

The invention features a frequency stabilized laser system. The system can be used for interferometry applications such as distance measuring interferometry.

Figure 1A:
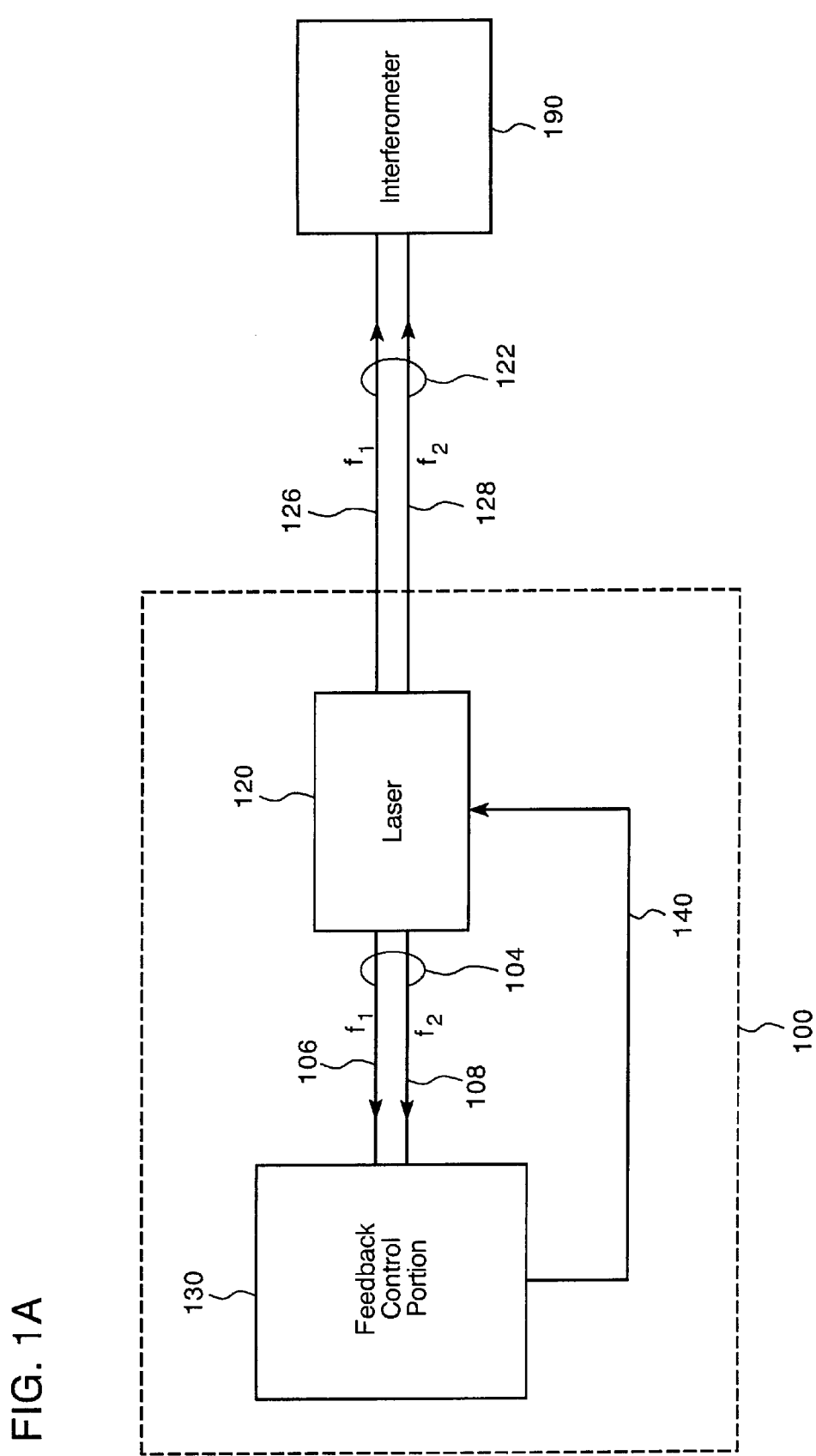
FIG. 1a is a schematic diagram of the frequency stabilized laser system.

One embodiment of the frequency stabilized laser system 100 is shown in FIG. 1a. System 100 includes a Zeeman-split Helium Neon (HeNe) laser 120 that produces a measurement beam 122 that includes two overlapping, collinear components 126 and 128 (shown separately in FIG. 1a), which have orthogonal polarizations and frequencies $f_1$ and $f_2$, respectively, caused by the Zeeman splitting. Zeeman-split lasers are well known in the art and use an external magnetic field to split degenerate quantum levels in the laser gain medium. As a result, a Zeeman-split laser can produce an output having two frequency components separated in frequency by an amount proportional to the magnetic field and having orthogonal polarizations. For example, HeNe laser 120 can have a cavity length of about 3 inches supporting a single longitudinal mode that is split into frequencies $f_1$ and $f_2$ by the Zeeman effect. Typically, the Zeeman splitting in such a laser causes frequencies $f_1$ and $f_2$ to differ by about 3 to 4 MHz, which is suitable for heterodyne interferometry applications.

Rather than using a Zeeman-split laser, in other embodiments, system 10 can include a laser having a birefringent element in its cavity to produce measurement beam 122 and components 126 and 128. The presence of the birefringent element causes the laser to produce resonant, orthogonally polarized modes having different frequencies. The birefringent element can be a passive element having a fixed birefringence (e.g., a piece of calcite or quartz) or an active element that provides a tunable birefringence (e.g., an electo-optic modulator, Faraday rotator, or Pockels cell). The tunable birefringence can be used to vary the frequency splitting between frequencies $f_1$ and $f_2$. In addition, in further embodiments, a multimode laser that supports two longitudinal lasing modes can be used to produce measurement beam 122 and components 126 and 128. For example, the multimode laser can be a multimode gas laser or a multimode solid-state laser. Similarly, the laser having a birefringent element can be a gas laser or a solid-state laser. In most, if not all, of the cases described above, the two lasing lines that produce components 126 and 128 will tend to have orthogonal polarizations because they resonate simultaneously in the laser cavity.

Measurement beam 122 exits laser 120 and can be used for a variety of applications. For example, measurement beam 122 can propagate to an interferometer 190. Cavity length variations, however, can cause laser 120 to alter the precise values of frequencies $f_1$ and $f_2$, which can adversely affect the performance of the laser application. To stabilize the frequencies, laser 120 also produces a control beam 104 that, like measurement beam 122, includes two overlapping and collinear components 106 and 108 (shown separately in FIG. 1a), which also have orthogonal polarizations and frequencies $f_1$ and $f_2$, respectively. As described further below, a feedback control portion 130 of system 100 analyzes control beam 104 to produce a control signal 140 that drives a transducer to offset the cavity length variations of laser 120. As a result, the system stabilizes frequencies $f_1$ and $f_2$ and compensates for variable conditions that would otherwise alter $f_1$ and $f_2$.

Figure 1B:
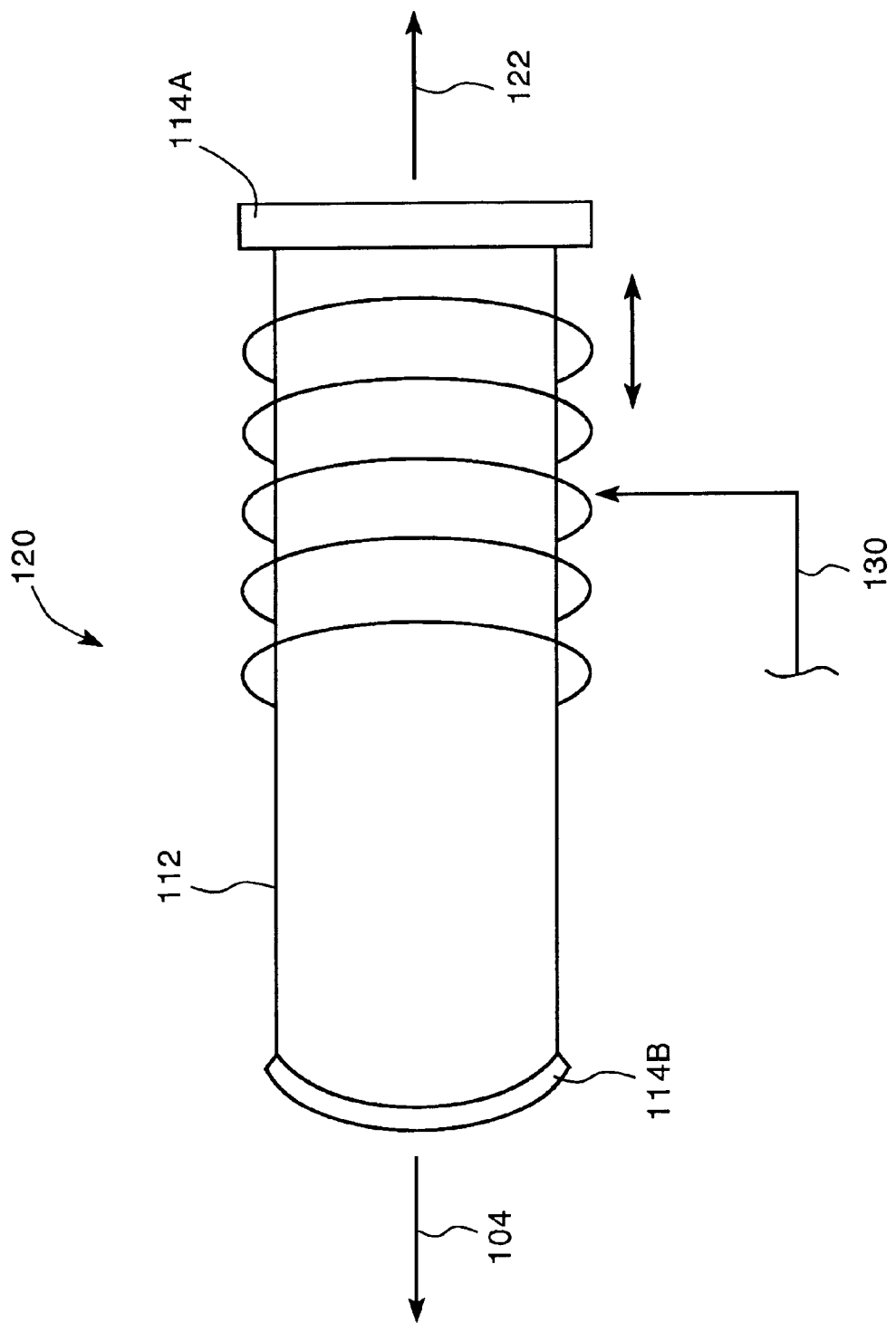

As shown in FIG. 1b, HeNe laser 120 includes a gas tube 112 having end mirrors 114a and 114b, mirror 114a being a flat output coupler and mirror 114b being a spherical high reflector. Such an arrangement is known as a hemispherical resonator, but other arrangements known in the art, such as a confocal resonator, are also possible. A heating coil 116 surrounds one end of tube 112 to form a transducer that converts an electrical signal into heat that causes tube 112 to expand, thereby controllably altering the cavity length of laser 120. During operation, control signal 140 causes heating coil 116 to heat tube 112 to a preset operating temperature above the ambient temperature, e.g., about 110–120° F. The heating causes thermal expansion of tube 112 and increases the cavity length of laser 120. As heat is lost to the surrounding environment, a quasi-static current must be supplied to heating coil 116 to maintain a particular cavity length. In response to its analysis of control beam 104, feedback control portion 130 causes a change in the quasi-static current to coil 116 to maintain a fixed cavity length. When the current to coil 116 heats tube 112 at a rate greater than the cooling rate due to ambient conditions, the tube expands and the cavity length increases. When the current to coil 116 heats tube 112 at a rate smaller than the cooling rate due to ambient conditions, the tube contracts, thereby decreasing the cavity length. In practice, the operating temperature and resistive properties of coil 116 are chosen such that the heating and cooling rates have comparable magnitudes. In other embodiments, the cavity length of laser 120 can be adjusted in response to control signal 140 by using a piezoelectric transducer attached to one of the end mirrors. More generally, any transducer can be used.

As also shown in FIG. 1b, control beam 104 exits laser 120 as leakage through end mirror 114b. In alternative embodiments, control beam 104 can be split off from measurement beam 122 using a beam splitter.

In many embodiments, components 106 and 108 of control beam 104 have orthogonal elliptical polarizations when entering feedback control portion 130. To produce such polarizations, end mirror 114b has a birefringent coating that causes components 106 and 108 to have orthogonal elliptical polarizations (as well as components 126 and 128). Alternatively, end mirror 114a or both end mirrors 114a and 114b can have such birefringent coatings. Moreover, in other embodiments, an additional birefringent component can be introduced into the cavity of laser 120 to cause the elliptical polarizations. Alternatively, in the absence of any such birefringence, laser 120 produces components 126 and 128 and components 106 and 108, respectively, with orthogonal circular polarizations. In such cases, an external birefringent element can be positioned between laser 120 and feedback control portion 130 to cause components 106 and 108 to have orthogonal elliptical polarizations when entering control portion 130.

Referring again to FIG. 1a, feedback control portion 130 analyzes control beam 104 to determine the relative intensities of components 106 and 108. Changes in the relative intensities of components of 106 and 108 indicate a change in the portions of the gain curve sampled by the components in laser 120, which corresponds to a change in the precise frequencies of $f_1$ and $f_2$. Conversely, the frequencies are stable when the intensity $I_1$ of component 106 and intensity $I_2$ of component 108 remain constant relative to one another, i.e., $I_1-aI_2=0$ where a is a constant. Feedback control portion 130 generates control signal 140 having a value S that is proportional to any deviation from stability, i.e., $S\ I_1-aI_2$. Using control signal 140 and heating coil 116, feedback control portion 130 adjusts the cavity length of laser 120 such that the value of S tends towards zero, thereby stabilizing frequencies $f_1$ and $f_2$. Determining whether the cavity length should be increased when S>0 and decreased when S<0, or decreased when S>0 and increased when S<0 can be calculated or performed empirically by determining which condition produces stable operation, i.e., minimizing cavity length variations.

Figure 2:
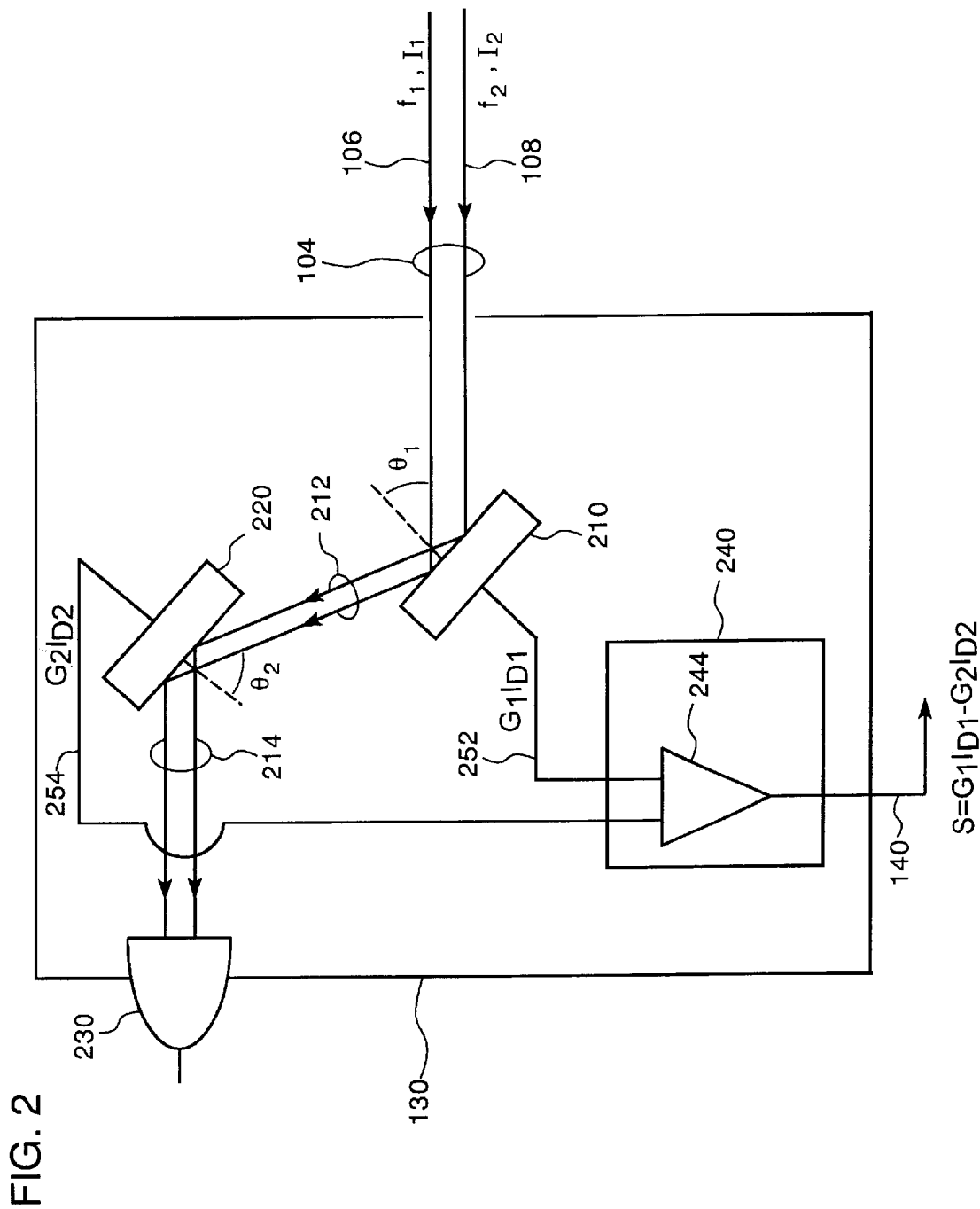

A schematic of feedback control portion 130 is shown in FIG. 2. Portion 130 includes detector 210, detector 220, fiber optic coupler 230, and control circuit 240. Detectors 210 and 220 are silicon detectors having no anti-reflection (AR) coatings. Control beam 104 contacts detector 210 at non-normal incidence, and detector 210 absorbs a portion of control beam 104 and reflects the remaining portion of control beam 104 toward detector 220 as reflected beam 212. Similarly, reflected beam 212 contacts detector 220 at non-normal incidence, and detector 220 absorbs a portion of reflected beam 212 and reflects the remaining portion of reflected beam 212 toward fiber optic coupler 230 as reference beam 214. Detector 210 measures the intensity $I_{D1}$ of the absorbed portion of control beam 104, generates an electrical signal 252 having a value proportional to the intensity $I_{D1}$, and sends signal 252 to control circuit 240. Similarly, detector 220 measures the intensity $I_{D2}$ of the absorbed portion of reflected beam 212, generates an electrical signal 254 having a value proportional to the intensity $I_{D2}$, and sends signal 254 to control circuit 240. As will be described in greater detail below, feedback control portion 130 exploits the polarization-dependent properties of reflection and refraction at the interface of at least one detector to generate control signal 140 such that $S\ I_1-aI_2$.

Control circuit 240 includes a differential amplifier 244 that receives signals 252 and 254 and generates control signal 140 such that the value S of control signal 140 is proportional to the difference between the values of signals 252 and 254. The gain $G_1$ of detector 210 differs from the gain $G_2$ of detector 220. Defining the relative gain R as being equal to $G_2/G_1$, the value S of control signal 140 is:

$$S=G_1(I_{D1}-RI_{D2}) \quad (1)$$

In addition, control circuit 240 can linearly weight the values of signals 252 and 254 relative to one another and generate the value S from the difference between the weighted values to produce a result functionally identical to EQU. 1, in which case R includes the weighting performed by control circuit 240 in addition to the different gains $G_1$ and $G_2$. Alternatively, the detector gains can be equal and control circuit 240 linearly weights the values of signals 252 and 254 as described above, except that $G_1$ and R in EQU. 1 correspond entirely to the weighting performed by control circuit 240.

At each of detectors 210 and 220, the relative intensities of frequency components $f_1$ and $f_2$ absorbed by the detector (i.e., the portion of the incident beam that is not reflected by the detector interface) depend on the incident angle to the detector interface and the respective polarizations of frequency components $f_1$ and $f_2$. The relative intensities can be calculated using the well-known Fresnel equations, as shown below. To use the Fresnel equations, the polarization of each frequency component is separated into an s-polarized component and a p-polarized component. With reference to an incident beam contacting an interface at a non-normal angle, the p-polarized component is the component of the incident beam's polarization (for a particular frequency) parallel to the plane of the interface and perpendicular to the propagation direction of the incident beam. The s-polarized component is the component of the incident beam's polarization (for a particular frequency) perpendicular to the p-polarized component and the propagation direction of the incident beam.

The Fresnel equations for reflected amplitudes $r_{s,p}$ and transmitted amplitudes $t_{s,p}$ of s-polarized and p-polarized light at the detector interfaces are as follows:

$$r_P = \frac{n_2 \cos(\theta_i) - n_1 \cos(\theta_r)}{n_2 \cos(\theta_i) + n_1 \cos(\theta_r)} \quad (2)$$

$$r_S = \frac{n_1 \cos(\theta_i) - n_2 \cos(\theta_r)}{n_1 \cos(\theta_i) + n_2 \cos(\theta_r)}$$

$$t_P = \frac{2n_1 \cos(\theta_i)}{n_2 \cos(\theta_i) + n_1 \cos(\theta_r)}$$

$$t_S = \frac{2n_1 \cos(\theta_i)}{n_1 \cos(\theta_i) + n_2 \cos(\theta_r)}$$

where $n_1$ is the index of air (1.0), $n_2$ the index of silicon (3.6+i0.02), and $\theta_i$ and $\theta_r$ are the angles of incidence and refraction, respectively. Because the frequencies of components 106 and 108 ($f_1$ and $f_2$) are analyzed separately, the total intensity $2I_0$ of control beam 104 can be expressed as:

$$2I_0 = |E_{1,S}|^2 + |E_{1,P}|^2 + |E_{2,S}|^2 + |E_{2,P}|^2 \quad (3)$$

where $E_{xy}$ is the electric field amplitude of the control beam for polarization y (s or p) of frequency component x (1 or 2), $I_1 = |E_{1,S}|^2 + |E_{1,P}|^2$, and $I_2 = |E_{2,S}|^2 + |E_{2,P}|^2$. Using EQUS. 2 and 3, the intensities $I_{D1}$ and $I_{D2}$ measured by detectors 210 and 220, respectively, can be expressed as:

$$I_{D1} = \eta(|t_S|^2 |E_{1,S}|^2 + |t_P|^2 |E_{1,P}|^2 + |t_S|^2 |E_{2,S}|^2 + |t_P|^2 |E_{2,P}|^2) \quad (4)$$

$$I_{D2} = \eta'(|t'_S|^2 |r_S|^2 |E_{1,S}|^2 + |t'_P|^2 |r_P|^2 |E_{1,P}|^2 + |t'_S|^2 |r_S|^2 |E_{2,S}|^2 + |t'_P|^2 |r_P|^2 |E_{2,P}|^2) \quad (5)$$

where $$\eta = \frac{n_r \cos(\theta_r)}{n_i \cos(\theta_i)},$$

is required for energy flow conservation in the detect material. EQUS. 3–5 assume that the bandwidth of the detectors is too low (e.g., about 10 Hz) to resolve an oscillating intensity term at the heterodyne frequency $f_1-f_2$ caused by the interference of frequencies $f_1$ and $f_2$. Alternatively, if one or both of the detectors have a bandwidth sufficient to resolve the heterodyne frequency, that detector or those detectors, respectively, time average or low-pass filter the intensity signal(s) to generate signals 252 and 254 with values proportional to the expressions for $I_{D1}$ and $I_{D2}$ in EQUS. 4 and 5. The primes in EQUS. 5 indicate that the respective terms correspond to reflection and transmission at the interface of the second detector.

Although there are some exceptions (discussed below), EQUS. 2–5 generally show that when the respective polarizations of components 106 and 108 differ and control beam 104 contacts detector 210 at non-normal incidence, the relative intensities of frequency components $f_1$ and $f_2$ absorbed by detector 210 differ from the relative intensities of frequency components $f_1$ and $f_2$ absorbed by detector 220. In the embodiment shown in FIG. 2, the polarizations of components 106 and 108 and the orientations of detectors 210 and 220 are selected to produce this result. In such cases, one of detectors 210 and 220 is more sensitive to the intensity of one of frequency component $f_1$ and $f_2$ and the other of detectors 210 and 220 is more sensitive to the intensity of the other of frequency component $f_1$ and $f_2$. Consequently, there exists a value for the relative gain R that scales the intensities $I_{D1}$ and $I_{D2}$ of light measured by detectors 210 and 220 such that S is proportional to $I_1-aI_2$, which represents the deviation in the output of laser 102 from the desired frequencies. The relative gain R satisfying this condition can be determined theoretically using EQUS. 1–5. For example, if frequency stability for the laser corresponds to $I_1=I_2$, relative gain R can be expressed as:

$$R = \frac{|t_S|^2 + |t_P|^2}{|t'_S|^2 |r_S|^2 + |t'_P|^2 |r_P|^2} \frac{\eta}{\eta'} \quad (6)$$

The relative gain R satisfying the condition (S $I_1-aI_2$) can also be determined experimentally by determining the value of R that causes signal S to be zero when intensities $I_1$ and $I_2$ are known to satisfy $I_1-aI_2=0$ based on an alternative calibration method, e.g., by measuring $f_1$ and $f_2$ directly.

As mentioned above, however, there are some exceptions that cause the relative intensities of frequency components $f_1$ and $f_2$ absorbed by detector 210 to be equal to the relative intensities of frequency components $f_1$ and $f_2$ absorbed by detector 220, in which case there is no value of R for which S $I_1-aI_2$. Such exceptions occur when, at each of the detector interfaces, the ratio of the intensities of the s- and p-polarized components of frequency component $f_1$ of the incident beam equals the ratio of the intensities of the s- and p-polarized components of frequency component $f_2$ of the incident beam. For example, if components 106 and 108 have exactly circular, orthogonal polarizations, there is no pair of orientations for detectors 210 and 220 that cause the relative intensities of frequency components $f_1$ and $f_2$ absorbed by detector 210 to be different from the relative intensities of frequency components $f_1$ and $f_2$ absorbed by detector 220.

For all other sets of orthogonal polarizations for components 106 and 108, however, detectors 210 and 220 can be oriented so that the relative intensities of frequency components $f_1$ and $f_2$ absorbed by detector 210 differ from the relative intensities of frequency components $f_1$ and $f_2$ absorbed by detector 220. EQUS. 1–5 can be used to find such suitable orientations. For example, when components 106 and 108 have orthogonal elliptical polarizations, orienting detector 210 so that the major and minor axes of the elliptical polarizations in control beam 104 fall along the directions of s- and p-polarization defined by the orientation of the detector 210 optimizes its discrimination between frequency components $f_1$ and $f_2$. Similarly, orienting detector 220 so that the major and minor axes of the elliptical polarizations in reflected beam 212 fall along the directions of s- and p-polarizations defined by the orientation of the detector 220 optimizes its discrimination between frequency components $f_1$ and $f_2$.

For such orientations of detectors 210 and 220, the sensitivity of the control signal S to small changes $\epsilon$ in the intensities of frequencies $f_1$ and $f_2$ about $I_1-aI_2=0$ can be derived from EQUS. 1–5 by differentiation. In particular, for such orientations and the case in which frequency stability corresponds to $I_1=I_2$, the sensitivity of the control signal can be expressed as:

$$\frac{\partial S}{\partial \varepsilon} = G(1-e^2)\left[(|t_P|^2-|t_S|^2)\eta - R(|t'_P|^2|r_P|^2-|t'_S|^2|r_S|^2)\eta'\right] \quad (7)$$

where for small changes $\epsilon$ in intensity, the two beams satisfy $I_1(\epsilon)=I-\epsilon$ and $I_2(\epsilon)=I+\epsilon$, where e is the ellipticity of the orthogonal elliptical components in control beam 104, which is defined by the ratio of the amplitudes along the minor and major axes of the polarization ellipse, and where the relative gain R is given by EQU. 6. EQU. 7 shows that as the elliptical polarizations of components 106 and 108 approach circular polarizations ($e\approx 1$), the sensitivity $\partial S/\partial \epsilon$ approaches zero. On the other hand, when the elliptical polarizations of components 106 and 108 approach linear polarizations ($e\approx 0$), the sensitivity $\partial S/\partial \epsilon$ is maximized (with respect to ellipticity).

Further analysis of EQU. 7 shows that for any angle of detector 220, the sensitivity $\partial S/\partial \epsilon$ is maximized when the angle of incidence for detector 210 is equal to Brewsters angle for the air/silicon interface:

$$\theta_B = \tan^{-1}\left(\frac{n_{Si}}{n_{air}}\right) = 74.476° \quad (8)$$

Thus, in one particular embodiment, detectors 210 and 220 are positioned such that the angles of incidence for control beam 104 and reflected beam 212 are both equal to Brewsters angle $\theta_B$. Such an embodiment optimizes sensitivity and also simplifies the determination of the relative gain R.

When the detectors are oriented at Brewsters angle, there is no reflection of p-polarized light at the detector interfaces, i.e., $r_P=0$. In addition, if it is assumed that the frequencies $f_1$ and $f_2$ are chosen with components 106 and 108 having equal intensities, i.e., $I_1=I_2=I_0$, the condition that the polarizations of components 106 and 108 be orthogonal requires that $E_{1,S}=E_{2,P}$ and $E_{1,P}=E_{2,S}$. Therefore, EQUS. 4 and 5 simplify to:

$$I_{D1}=I_0\eta(|t_S|^2+|t_P|^2) \quad (8)$$

$$I_{D2}=I_0\eta|t_S|^2|r_S|^2 \quad (9)$$

Thus, to make S=0 implies that R must be:

$$R = \frac{|t_S|^2+|t_P|^2}{|t_S|^2|r_S|^2} \approx 6.5 \quad (10)$$

based on the silicon/air interfaces.

As shown, positioning detectors 210 and 220 such that the incident angles are at Brewsters angle can simplify the determination of R and optimize sensitivity. However, in general, the incident angles for detectors 210 and 220 can be different from one another and can each vary over a wide range of values, e.g., from about 5° to 85°. In addition, the plane defined by the beam incident on the detector 210 and the normal to detector 210 can differ from the plane defined by the beam incident on detectors 220 and the normal to detector 220. In other words, detectors 210 and 220 can be rotated about non-parallel axes to produce the non-normal incident angles. Furthermore, in other embodiments, the incident angle onto detector 210 can be non-normal and the incident angle onto detector 220 can be substantially normal.

In addition, in other embodiments, the polarizations of components 106 and 108 differ from one another, but do not need to be orthogonal to one another. Furthermore, in other embodiments, the control loop can be stabilized about values of S other than zero, providing stabilization for intensity ratios of control beam components 106 and 108 other than 1. Finally, in other embodiments the detectors need not be silicon detectors but can each be any detector that provides an interface for which reflection and transmission is polarization dependent.

Following the equations above, the time-averaged intensity $I_{REF}$ of reference beam 214 reflected from detector 220 can be expressed as:

$$I_{REF}=|r'_S|^2|r_S|^2|E_{1,S}|^2+|r'_P|^2|r_P|^2|E_{1,P}|^2+|r'_S|^2|r_S|^2|E_{2,S}|^2+|r'_P|^2|r_P|^2|E_{2,P}|^2 \quad (11)$$

As indicated by EQU. 11, reference beam 214 generally includes frequency components $f_1$ and $f_2$ produced by laser 120. The polarization-dependent reflections from detectors 210 and 220 mix the orthogonal polarizations of frequency components $f_1$ and $f_2$ so that reference beam 214 includes an optical interference signal at the heterodyne frequency $f_1-f_2$. Fiber optic coupler 230 receives reference beam 214 and the optical interference signal can be sent, e.g., by fiber optic cable, to a phase meter system. Alternatively, in other embodiments, a fiber optic coupler is not necessary and the reference beam is transmitted through free space to the phase meter system. As described in greater detail further below, the phase meter system compares the phase of the heterodyne signal from the reference beam with the phase of a heterodyne signal of an output beam from an interferometer.

When detectors 210 and 220 are positioned such that the incident angle of beam 140 on detector 210 equals the incident angle of beam 212 on detector 220, reference beam 214 propagates parallel to control beam 140 and the length of laser 120. Such an arrangement simplifies the coupling of reference beam 214 into fiber optic coupler 230.

Figure 3:
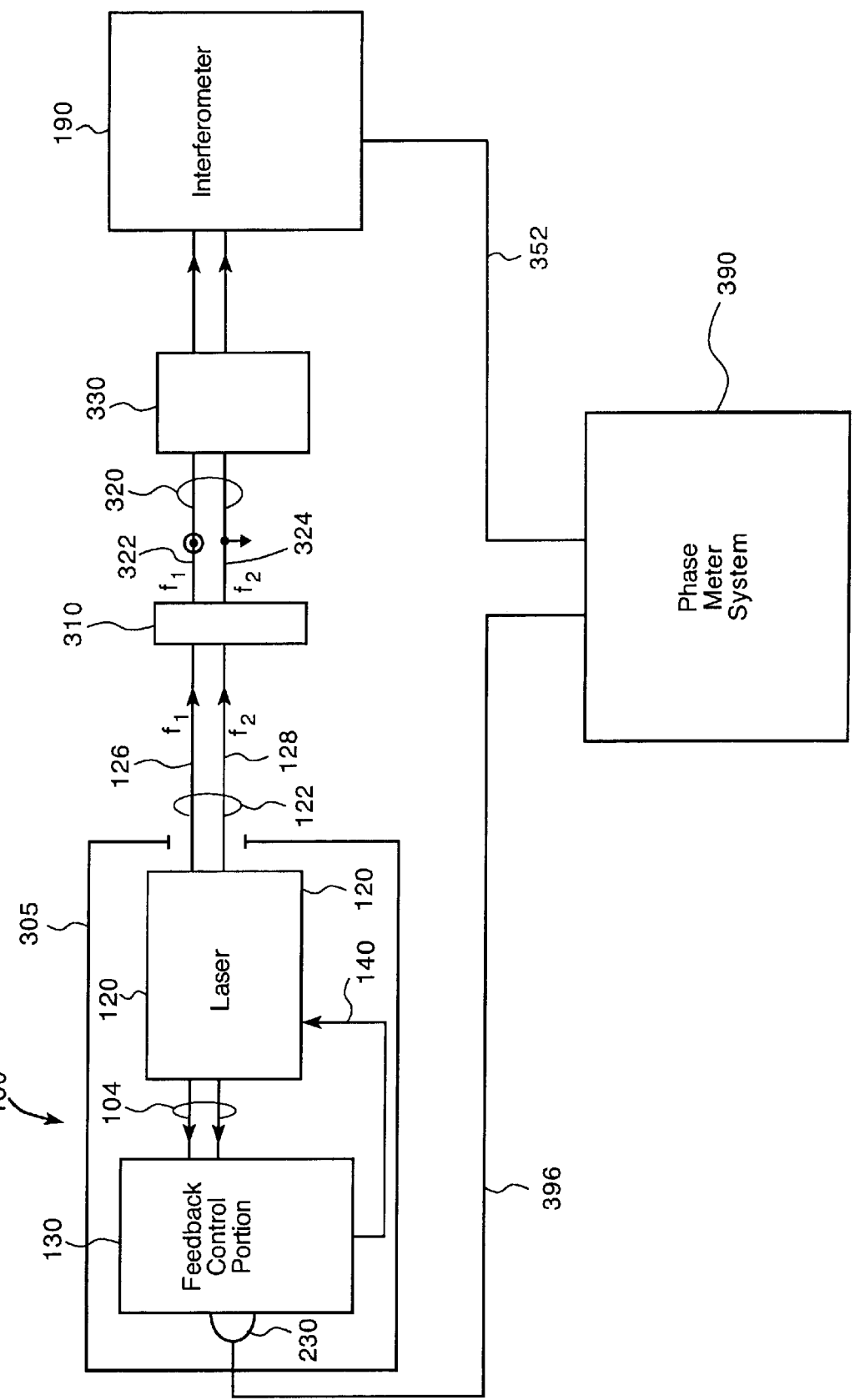
FIG. 3 is a schematic diagram of the frequency stabilized laser system of FIG. 1a in use with an interferometry system.

As shown in FIG. 3, the frequency stabilized laser system 100 can be used with an interferometer 190 to perform interferometric distance measurements. System 100 encloses laser 120 and feedback control portion 130 in a common housing 305. System 100 produces measurement beam 122, which includes component 126 with frequency $f_1$ and components 128 with frequency $f_2$, wherein components 126 and 128 having orthogonal elliptical polarizations. A birefringent element 310 receives measurement beam 122 and converts the orthogonal elliptical polarizations of components 126 and 128 into orthogonal linear polarizations. A converted measurement beam 320 emerges from birefringent element 310 having components 322 and 324. Component 322 includes frequency $f_1$ and is linearly polarized perpendicular to the plane of FIG. 3 and component 324 includes frequency $f_2$ and is linearly polarized parallel to the plane of FIG. 3. Thereafter, a beam expander 330 receives measurement beam 320, increases its transverse profile to a size suitable for interferometer 190, and then directs measurement beam 320 to interferometer 190. In other embodiments, birefringent element 310 and beam expander 330 can be included within housing 305.

Interferometer 190 is a heterodyne distance measuring interferometer that directs one of components 322 and 324 along a measurement path contacting a movable measurement object and directs the other of the components along a reference path. The interferometer then recombines the components and mixes their polarizations to produce an output beam having an optical interference signal. If the measurement object is stationary during the measurement, the frequency of the optical interference signal is equal to the heterodyne frequency $f_1-f_2$. If the measurement object is moving during the measurement, the frequency of the optical interference signal further includes a Doppler term. Changes in the optical path length to the measurement object cause changes in the phase of the optical interference signal in the output beam. A fiber optic coupler in interferometer 190 can receive the output beam to transmit the output beam to a phase meter system 390 using optical fiber 352.

As described previously, feedback control portion 130 in laser system 100 produces a reference beam that includes an optical interference signal at the heterodyne frequency $f_1-f_2$. Optical fiber 396 carries the reference beam to phase meter system 390. Phase meter system 390 measures the time-varying intensities of the reference beam and the output beam and determines the motion and position of the measurement object by analyzing the optical interference signals in the measurement beam and the reference beam. Suitable components for phase meter system 390 are well known in the field of interferometry.

In other embodiments, feedback control portion 130 can produce the heterodyne frequency electronically, rather than, or in addition to, producing the heterodyne signal optically in reference beam 214. The heterodyne signal is already present optically in the absorbed portion of beam 104 incident on detector 210 and the absorbed portion of beam 212 incident on detector 220 because of the reflection (and transmission) at the detector interfaces is polarization-dependent. Therefore, in such embodiments, one of the detectors in the control portion has a bandwidth sufficient to resolve the optical interference signal at the heterodyne frequency $f_1-f_2$, generates a high bandwidth signal at the heterodyne frequency $f_1-f_2$, and also generates, by time-averaging or low pass filtering, a low bandwidth signal indicative of the DC intensity. The low bandwidth signal is sent to the control circuit as described previously. The high-bandwidth electronic signal can be sent to the phase meter system to determine the reference phase. In one such embodiment, detector 220 is the high-bandwidth detector and is oriented normal to reflected beam 212 to minimize the spot size of beam 212 on detector 220. Because the spot size is minimized, the active area in detector 220 (for optical detection) can be small, which minimizes capacitance and improves the high-bandwidth measurement.

Frequency stabilized laser system 100 can be used with any interferometer known in the art, including, e.g., distance measuring interferometers such as plane mirror or high stability interferometers and dispersion interferometers. In some embodiments, the interferometer can be a heterodyne interferometer such as the one shown in FIG. 3 in which the beams propagating along the measurement and reference paths of the interferometer have different frequencies. Alternatively, in other embodiments, the interferometer can be a homodyne interferometer in which only a single frequency is used for the interferometric measurement. More generally, the frequency stabilized laser system can be used with any application for which frequency stability in the laser output is beneficial.

Other aspects, advantages, and modifications are within the scope of the following claims.

What is claimed is:
1. A frequency stabilized laser system comprising:
  a laser source which during operation produces a control beam including two frequency components having different polarizations, the laser source having an adjustable cavity length;
  a first detector which during operation absorbs a portion of the control beam, reflects the remaining portion of the control beam, and generates a first signal proportional to the intensity of the absorbed portion of the control beam;
  a second detector which during operation absorbs a portion of the reflected beam and generates a second signal proportional to the intensity of the absorbed portion of the reflected beam; and
  a circuit which during operation receives the first and second signals from the detectors, generates a control signal based on the first and second signals, the control signal controlling the adjustable cavity length.

2. The system of claim 1, wherein during operation the control beam contacts the first detector at a first angle of incidence and the reflected beam contacts the second detector at a second angle of incidence such that the relative intensities of the two frequency components in the absorbed portion of the control beam differs from the relative intensities of the two frequency components in the absorbed portion of the reflected beam.

3. The system of claim 1, wherein during operation the gain of the first detector when producing the first signal differs from the gain of the second detector when producing the second signal and wherein the control signal is based on the difference between the first and second signals.

4. The system of claim 1, wherein during operation the circuit generates the control signal based on a weighted difference between the first and second signals.

5. The system of claim 1, wherein during operation the control beam contacts the first detector at a first angle of incidence in a range between 5° and 85°.

6. The system of claim 1, wherein the different polarizations are orthogonal elliptical polarizations.

7. The system of claim 1, wherein during operation there are no intervening optics Contacting the control beam between the laser source and the first detector.

8. The system of claim 1, wherein during operation there are no intervening optics contacting the reflected beam between the first and second detectors.

9. The system of claim 1, wherein the first detector is a silicon detector that does not have an antireflection coating.

10. The system of claim 1, wherein during operation the second detector reflects a portion of the reflected beam to produce a reference beam and wherein the control beam contacts the first detector at a first angle of incidence and the reflected beam contacts the second detector at a second angle of incidence such that the reference beam comprises the two frequency components.

11. The system of claim 10 further comprising a fiber optic coupler positioned to receive the reference beam.

12. The system of claim 10, wherein the first angle of incidence is substantially equal to the second angle of incidence.

13. The system of claim 10, wherein the first and second detectors are silicon detectors that do not have antireflection coatings.

14. The system of claim 10, wherein during operation the laser source also produces a measurement beam comprising the two frequency components.

15. An interferometry system comprising:

the frequency stabilized laser system of claim 14;

an interferometer which during operation receives the measurement beam from the laser system and directs a portion of the measurement beam along a path contacting a measurement object and recombines the portion with a remaining portion of the measurement beam to produce an output beam; and a detection system which during operation receives the output and reference beams, measures frequencies of the output and reference beams, and determines changes in an optical path length to the measurement object based on the measured frequencies.

16. The system of claim 1, wherein during operation the laser source also produces a measurement beam comprising the two frequency components.

17. An interferometry system comprising:

the frequency stabilized laser system of claim 16;

an interferometer which during operation receives the measurement beam from the laser system and directs a portion of the measurement beam along a path contacting a measurement object and recombines the portion with a remaining portion of the measurement beam to produce an output beam having a phase indicative of changes in an optical path length to the measurement object.

18. The system of claim 1, wherein the laser source includes a Zeeman-split laser that produces the control beam comprising the two frequency components having the different polarizations.

19. The system of claim 18, wherein the Zeeman-split laser includes a birefringent element that causes the different polarizations to be different elliptical polarizations.

20. The system of claim 19, wherein the birefringent element is a coated cavity mirror.

21. The system of claim 18, wherein the laser source further comprises a birefringent element positioned to receive an input beam from the Zeeman-split laser and produce the control beam, wherein the birefringent element causes the different polarizations of the control beam to have different elliptical polarizations.

22. The system of claim 16, wherein the control beam is derived from leakage through one of the cavity mirrors in the laser source.

23. The system of claim 1, wherein at least one of the first and second detectors has a bandwidth sufficient to resolve an optical interference signal at a frequency that is equal to the difference frequency of the two frequency components.

24. The system of claim 1, wherein the laser source includes a transducer, which during operation adjusts the cavity length of the laser source.

25. The system of claim 24, where in the laser source further comprises a gas tube defining the cavity length and wherein the transducer comprises a heating coil in thermal contact with the gas tube.

26. A method for stabilizing the frequency output of a laser source producing a control beam including two frequency components having different polarizations, the laser source having an adjustable cavity length, the method comprising:

directing the control beam to a first detector that absorbs a portion of the control beam, reflects the remaining portion of the control beam, and measures an intensity of the absorbed portion of the control beam;

directing the reflected beam to a second detector that absorbs a portion of the reflected beam and measures an intensity of the absorbed portion of the reflected beam; and adjusting the cavity length of the laser source based on a control signal derived from the intensities measured by the first and second detectors.

27. The method of claim 26, further comprising determining the control signal by scaling the intensities measured by the first and second detectors such that the difference between the scaled intensities is indicative of the relative intensities of the two frequency components produced by the laser source.

28. The method of claim 26, further comprising resolving an interference signal in the measured intensity of at least one of the detectors corresponding to the difference frequency of the two frequency components produced by the laser source.

29. The method of claim 26, wherein the second detector reflects a portion of the reflected beam to define a reference beam, the method further comprising measuring an optical interference signal in a reference beam corresponding to the difference frequency of the two frequency components produced by the laser source.

30. An interferometry method comprising:

stabilizing the frequency output of a laser source according to claim 26; and using the stabilized output to make interferometric measurements.

* * * * *

UNITED STATES PATENT AND TRADEMARK OFFICE
CERTIFICATE OF CORRECTION

PATENT NO. : 6,434,176 B1
DATED : August 13, 2002
INVENTOR(S) : Leslie L. Deck

It is certified that error appears in the above-identified patent and that said Letters Patent is hereby corrected as shown below:

Title page,
Item [56], OTHER PUBLICATIONS, "Yasui et al. reference", after "lock" insert -- of --.

Column 6,
Line 23, after "S" insert -- $\propto$ --.

Column 7,
Line 48, replace the equation with $$-- 2I_0 = |E_{1,S}|^2 + |E_{1,P}|^2 + |E_{2,S}|^2 + |E_{2,P}|^2 \qquad (3) --.$$

Line 53, replace the equation with $$-- I_1 = |E_{1,S}|^2 + |E_{1,P}|^2, \text{ and } I_2 = |E_{2,S}|^2 + |E_{2,P}|^2. --$$

Lines 55-60, replace the equations with $$-- I_{D1} = \eta \left( |t_S|^2 |E_{1,S}|^2 + |t_P|^2 |E_{1,P}|^2 + |t_S|^2 |E_{2,S}|^2 + |t_P|^2 |E_{2,P}|^2 \right) \qquad (4)$$

$$I_{D2} = \eta' \left( |t'_S|^2 |r_S|^2 |E_{1,S}|^2 + |t'_P|^2 |r_P|^2 |E_{1,P}|^2 + |t'_S|^2 |r_S|^2 |E_{2,S}|^2 + |t'_P|^2 |r_P|^2 |E_{2,P}|^2 \right) \qquad (5) --.$$

Column 8,
Lines 38 and 48, after "S" insert -- $\propto$ --.

Column 9,
Lines 12, 22, 29, 32 and 35, replace "$\epsilon$" with -- $\varepsilon$ --.
Line 23, replace "$\epsilon$" with -- $\varepsilon$ -- (all occurrences).

UNITED STATES PATENT AND TRADEMARK OFFICE
CERTIFICATE OF CORRECTION

PATENT NO. : 6,434,176 B1
DATED : August 13, 2002
INVENTOR(S) : Leslie L. Deck

It is certified that error appears in the above-identified patent and that said Letters Patent is hereby corrected as shown below:

Column 12,
Line 46, replace "Contacting" with -- contacting --.

Signed and Sealed this

Twenty-second Day of April, 2003

JAMES E. ROGAN
*Director of the United States Patent and Trademark Office*